Sept. 22, 1953 T. E. MOORE ET AL 2,653,301

COAXIAL RESONANT LINE COUPLING MEANS

Filed April 30, 1946

INVENTORS
THOMAS E. MOORE
KARL R. SPANGENBERG
HOWARD M. ZEIDLER

By: William D. Hall,
ATTORNEY

Patented Sept. 22, 1953 2,653,301

UNITED STATES PATENT OFFICE 2,653,301

COAXIAL RESONANT LINE COUPLING MEANS

Thomas E. Moore, Austin, Tex., and Karl R. Spangenberg and Howard M. Zeidler, Palo Alto, Calif., assignors to the United States of America as represented by the Secretary of War Application April 30, 1946, Serial No. 666,002

3 Claims. (Cl. 333—24)

This invention relates generally to a radio frequency coupling means and more particularly to a composite probe-loop coupler.

One method for extracting radio frequency energy from a resonant cavity employs either a loop coupler or a probe coupler, depending upon the wavelength and upon the type of field which exists in the cavity at the coupler position. A loop coupler projects into the cavity at a low-impedance region of the cavity whereas a probe coupler is introduced into a high-impedance region of the cavity. In some oscillators, it is impossible to position either a simple loop or a simple probe in such a region of the cavity that adequate power will be coupled from the oscillator over the entire tuning range. An object of the present invention is to provide a composite probe-loop coupler which is energized by a magnetic field throughout part of a frequency range, and electrostatically throughout the remainder. In this respect, the composite coupler will function as a so-called "broad band coupler" in that it will be operable between fairly wide frequency limits.

In one type of microwave oscillator, a resonant coaxial line section is employed as the frequency determining element in combination with a vacuum tube. An adjustable plunger within the coaxial line is positioned such that the length of the coaxial line is substantially ¼ or ¾ of a wavelength at the operation frequency. For extremely high frequencies, the plunger must necessarily be positioned very close to the vacuum tube itself, and the physical dimensions of the line structure will then be extremely small. The only fixed position at which a non-composite type of coupler could be placed, and at the same time afford optimum coupling over a broad tuning range, would be at a high impedance point within the vacuum tube itself. This is not always possible. Therefore, another object of the present invention is to adapt the composite probe-loop coupler embodying the principles of this invention for use in a fixed position within a resonant coaxial line.

A loop or probe coupling means which is used for extracting radio frequency energy from an enclosure may also be used for injecting radio frequency energy into and thereby exciting an electric field within the enclosure. It is a further object of the invention that the composite coupler embodying the principles of this invention be adapted for the injection of radio frequency energy into an enclosure as well as the extraction therefrom. And still another object is that the composite coupler embodying the principles of this invention shall be simple, compact, and possess broad band characteristics.

Figure 1:
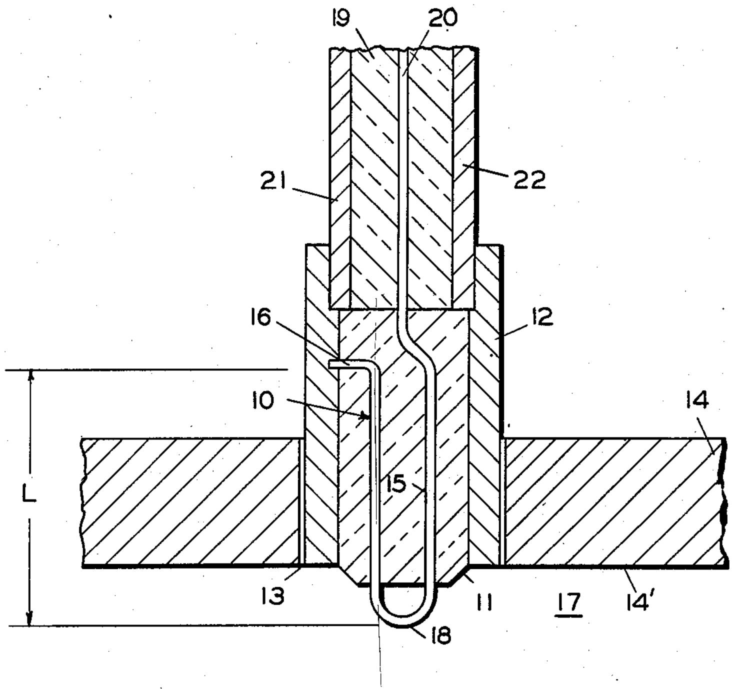
Figure 2:
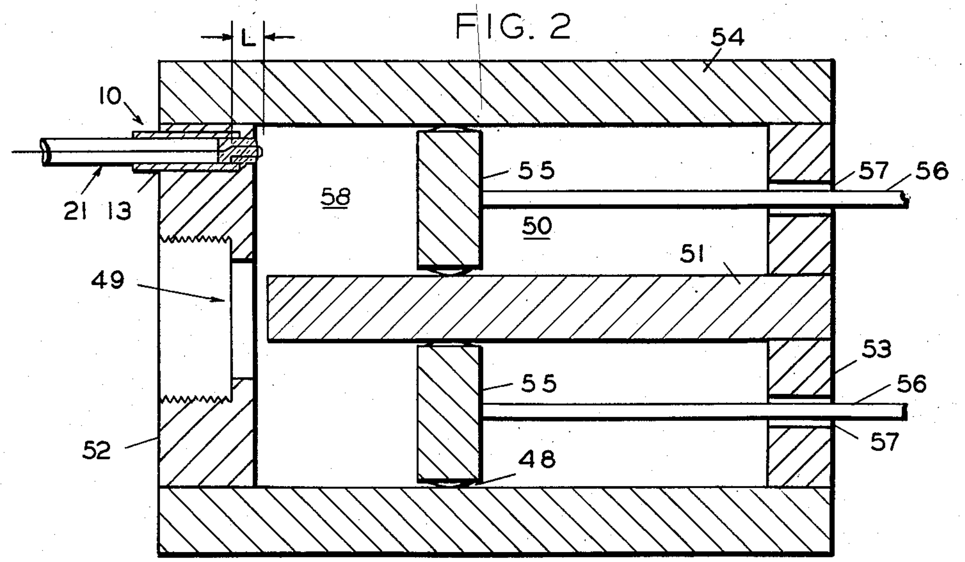

Other objects, features and advantages of this invention will suggest themselves to those skilled in the art, and will become apparent from the following description of the invention, taken in connection with the accompanying drawings, in which:

Fig. 1 is a cross-sectional view of a composite probe-loop coupler embodying the principles of this invention; and Fig. 2 is a cross-sectional view of a selected resonant coaxial line including the composite coupler shown in Fig. 1.

The composite coupler of this invention may consist essentially of a loop-probe 10 embedded, over most of its length, inside a cylindrically shaped dielectric slug 11 which is surrounded by a hollow metallic tube 12. Tube 12 projects through a hole 13 in outer wall 14 of a cavity structure 17, and is in electrical contact with wall 14. Surface 14' is the inside surface of the cavity structure.

Loop-probe 10 comprises a solid conductor 15 bent in substantially a rectangular shape and embedded in the dielectric slug. One portion of the loop-probe 10 projects out through the bottom of the dielectric slug 11 into the free space of cavity 17 to form a loop 18. One end of conductor 15 emerges from the dielectric slug 11 and is electrically connected to point 16 on tube 12. The opposite end of conductor 15 projects out of the top of dielectric slug 11, and is connected to the center conductor 20 of coaxial output cable 21. Outer conductor 22 of coaxial output cable 21 is electrically connected to hollow tube 12. Cable 21 may include a dielectric material 19 between center conductor 20 and outer conductor 22.

The length L in Fig. 1 refers to the length of the loop-probe 10 from point 16 to the tip of loop 18. For a fixed length L, the composite loop-probe 10 functions substantially as a loop or as a probe, depending upon the wavelength $\lambda$, as measured in the dielectric material, of the radio frequency energy applied to the coupler. For any radio frequency energy having a wavelength satisfying Equation 1 shown below, the loop-probe short at point 16 reflects to the tip of loop 18 as a low impedance.

$$L=\frac{n\lambda}{2} \qquad (1)$$

where $n$ is any integer 1, 2, 3, . . .

The tip of loop 18 is effectively shorted to the inside wall 14' of cavity 17, and the composite loop-probe functions substantially as a loop projecting within the cavity. The loop coupling is characterized by having a high coupling factor C as defined by Equation 2 shown below.

$$C=A_1/A_w \qquad (2)$$

where:

$A_1$=effective area of the loop intercepted by the cavity; and $A_w$=effective area of the wire surface protruding into the cavity.

For any radio frequency having a wavelength $\lambda'$, and satisfying Equation 3 shown below, the loop-probe short at point 16 is referred to the tip of loop 18 as a high impedance.

$$L=\frac{(2K+1)\lambda'}{4} \qquad (3)$$

where $K$=0, 1, 2, 3, 4, 5, . . .

For this condition, the loop-probe corresponds to a straight probe which projects into the cavity.

The probe coupling is characterized by having a low coupling factor C as defined by Equation 2 shown above. The coupling factor may be effectively reduced for the case of the probe coupler by the addition of a small plate (not shown) to the tip of loop 18.

It will be evident to those skilled in the art that at frequencies having wavelengths intermediate to those specifically defined, composite loop-probe 10 may function substantially as a combination loop and probe.

A selected coaxial resonant line utilizing the composite coupler embodying the principles of this invention, and such as might be employed in a microwave oscillator, is shown in Fig. 2. High frequency energy is supplied to the line section through aperture 49 by well known means. As mentioned heretofore, the invention contemplates a composite coupling means which is used to extract radio frequency energy over substantially broad frequency limits from the coaxial resonant line. The resonant line comprises an annularly shaped inclosure 50 formed by a center conductor 51, end plate portions 52 and 53, and the concentrically spaced outer conductor 54. Annular plunger 55 is set within inclosure 50 in a plane transverse to the axis of center conductor 51. Its inner and outer edges are in electrical contact with the inner surface of outer conductor 54 and the outer surface of center conductor 51 by means of friction contacts 48. Plunger 55 is adjusted from outside the section by suitable means, such as rods 56, attached thereto and projecting through holes 57 in portion 53.

Plunger 55 is positioned such that a section 58 in inclosure 50, being formed by end portion 52, plunger 55, and a section of the outer conductor, becomes resonant at the particular radio frequency energy injected therein. Oscillations are thereby sustained within resonant section 58. Composite loop-probe 10 projects through hole 13 in portion 52. The structural features of the composite loop-probe embodying the principles of this invention have already been described in connection with Fig. 1. The length L in Fig. 2 corresponds to the length L in reference to Fig. 1. Radio frequency energy extracted from the cavity by the loop-probe 10 is conducted out by means of output coaxial line 21.

When such a resonant line is incorporated in a microwave radio frequency oscillator which utilizes a ¾ wavelength resonant line, plunger 55 is positioned substantially ¾ wavelength at the operated frequency from end portion 52. A strong electric field having a wavelength $\lambda$ will exist in the resonant section 58, and composite loop-probe 10 will extract radio frequency energy from the section over limits defined by the maximum wavelength $\lambda_{max}$ and the minimum wavelength $\lambda_{min}$, where $\lambda_{max}$ is approximately equal to two times $\lambda_{min}$. For such frequency limits, the length L of loop-probe 10 is substantially $\lambda_{min}/4$ or stated alternatively is equal to $\lambda_{max}/8$.

When such a resonant line is incorporated in a microwave oscillator which utilizes a one-quarter wavelength resonant line, plunger 55 is positioned substantially one-quarter wavelength at the operating frequency from end portion 52. For such a resonant line and for the operating frequency limits of $\lambda_{min}$ to $\lambda_{max}$, mentioned heretofore, the length L of loop-probe 10 is substantially $\lambda_{min}/2$ or stated alternatively $\lambda_{max}/4$. For any other applications having similar frequency range limitations, the length L is adjusted accordingly.

Such a composite probe-loop coupler is adapted for coupling together a plurality of resonant line sections such as might be used between the anode-grid and the grid-cathode resonant line sections of a radio frequency oscillator. It may also be incorporated as the coupling means between a plurality of resonant cavities.

The composite probe-loop coupler has been described in connection with the extraction of radio frequency energy from a cavity or resonant line. It is also adapted for injecting radio frequency energy into a coaxial line or cavity and exciting an electric field therein.

The composite probe-loop coupler is simple and compact, and allows satisfactory wide band coupling even in those cases where the probe-loop cannot be located at the optimum point in the cavity or resonant line. In the $3\lambda/4$ oscillator, effective probe coupling is achieved at the short wavelength limit, and loop-probe coupling at the long wavelength limit. In the $\lambda/4$ oscillator, effective loop coupling is achieved at the short wavelength limit, and effective probe coupling at the long wavelength limit.

While there has been described hereinabove what is at present considered to be a preferred embodiment of this invention, it will be obvious to those skilled in the art that various changes and modifications may be made therein without departing from the true spirit and scope of the invention.

What is claimed is:

1. A composite probe-loop coupler comprising a dielectric slug, a hollow tube enclosing said dielectric slug, and an elongated conductor passing through said tube and having one end protruding out of one end of said slug, the other end of said conductor being doubled back to form a loop, said loop having a first portion embedded in said dielectric slug and a second portion protruding out of the other end of said slug and out of one end of said tube, said other end of said conductor being connected to said tube at a substantial distance from said one end of said tube, said loop having an elongated, substantially rectangular shape with its longer dimension being effectively equal to a quarter wave length at an operating frequency of said coupler.

2. A composite probe-loop coupler for operation between the limits of two given frequencies, the first of said frequencies being twice that of the second of said frequencies, comprising a hollow conductive tube, and a conductor passing through said tube and having one end doubled back within said tube to form a loop, said loop being partially inside said tube with an outer portion extending outside of one end of said tube, said one end of said conductor being shorted to said tube at a distance from the tip of said outer portion of said loop that is effectively equal to an odd number of quarter wavelengths at said second frequency and an integral number of half wave lengths at said first frequency.

3. The coupler of claim 2 further including a dielectric slug disposed within said hollow tube and substantially about the portion of said loop within said tube.

THOMAS E. MOORE.
KARL R. SPANGENBERG.
HOWARD M. ZEIDLER.

References Cited in the file of this patent

UNITED STATES PATENTS

| Number | Name | Date |
|---|---|---|
| 2,311,520 | Clifford | Feb. 16, 1943 |
| 2,351,895 | Allerding | June 20, 1944 |
| 2,401,637 | Harries | June 4, 1946 |
| 2,404,542 | Sloan | July 23, 1946 |
| 2,423,416 | Sontheimer | July 1, 1947 |
| 2,490,845 | Sorg | Dec. 13, 1949 |
| 2,550,524 | Braden | Apr. 24, 1951 |